Feb. 3, 1970    E. JOHNS    3,493,921
SONIC WAVE ENERGY APPARATUS AND SYSTEMS
Filed Feb. 5, 1968
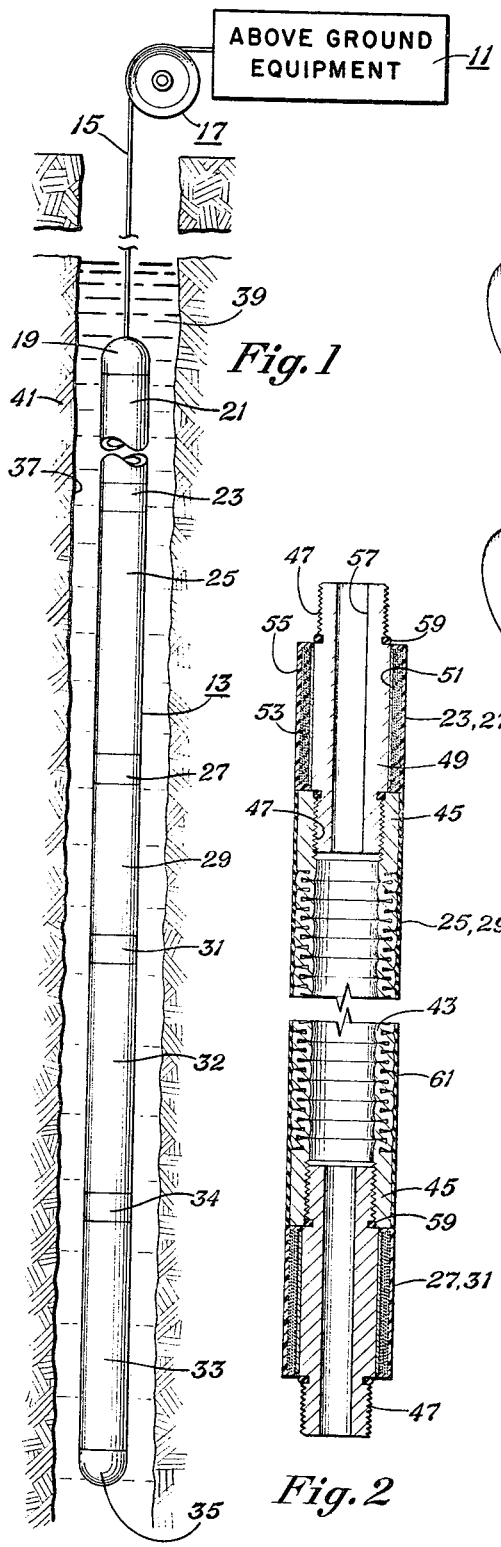
Fig.1
Fig.2
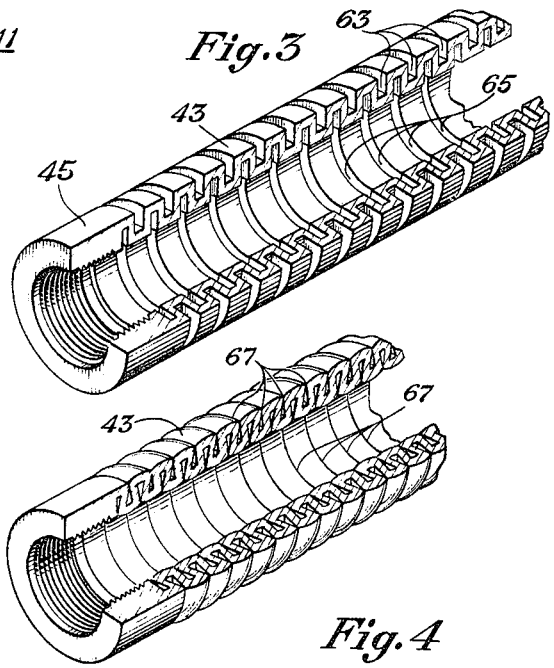
Fig.3
Fig.4
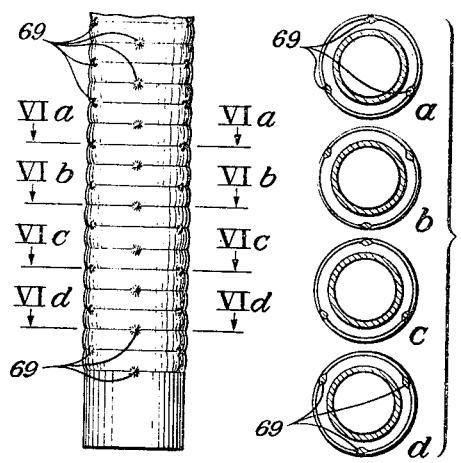
Fig.5    Fig.6
INVENTOR
Earl Johns
BY
Wofford & Felsman
ATTORNEYS United States Patent Office 3,493,921
Patented Feb. 3, 1970

3,493,921
SONIC WAVE ENERGY APPARATUS
AND SYSTEMS
Earl Johns, Fort Worth, Tex., assignor to Gearhart-Owen
Industries, Inc., Fort Worth, Tex.
Filed Feb. 5, 1968, Ser. No. 702,975
Int. Cl. G01v 1/16
U.S. Cl. 340—17                     9 Claims

ABSTRACT OF THE DISCLOSURE

A sonic wave energy transmission system to be utilized in an environment of high external fluid pressures has at least two transducers which are maintained in spaced apart relation by support structure which includes an elongated metal tubular member and at least a portion of the tubular member has the configuration of a collapsed bellows, which configuration achieves desired characteristics as to structural integrity, sonic delay and sonic attenuation.

BACKGROUND OF THE INVENTION

In sonic wave energy transmission systems to be utilized in an environment of high external fluid pressures and wherein transducers are maintained in spaced apart relation by support structure, some special problems are presented. Such problems derive primarily from the requirement that sonic wave energy traveling via a direct path between adjacent transducers must be delayed to prevent interference with desired sonic wave energy signals traveling via other paths. Excellent examples of such systems are found in the sonic bore hole logging art. Sonic bore hole logging tools generally have the form of an elongated tube made up of several tubular sections. Typically, a transmitter section may be spaced only a few feet from a receiver section, being separated by an isolator section. The isolator section serves as a mechanical support and also to delay sonic wave energy. Sonic wave energy isolator sections devised and utilized in the prior art of which I am aware, are subject to disadvantages. Some isolator sections, notably those made of rubber or the like, have undesirable flexibility and also must be pressure equalized, which adds further complications. Some isolator sections have been made of rigid type materials, such as steel, utilizing various configurations of milled slots or grooves to achieve sonic energy delay or attenuation effects. These have left considerable room for improvement, due to deficiencies of structural characteristics, effectiveness of performance, and economy of manufacture.

BRIEF DESCRIPTION OF DRAWING

FIG. 1 is a schematic elevational view, showing a sonic bore hole logging system in which the present invention in accordance with a preferred embodiment may be utilized; FIG. 2 is a schematic longitudinal section view showing a portion of the down hole tool of FIG. 1, including adjacent transducers and a typical isolator section, in accordance with a preferred embodiment; FIG. 3 is a schematic perspective view, partly in section, showing a typical length of bellows structure prior to collapse; FIG. 4 is a schematic perspective view, partly in section, showing the structure of FIG. 3 after collapse; FIG. 5 is a schematic side elevational view of a typical length of collapsed bellows structure with tack welds applied to abutting outer marginal portions of grooves; and FIGS. 6a through d are transverse section views taken respectively at lines VIa through VId of FIG. 5.

DESCRIPTION OF PREFERRED EMBODIMENTS

In FIG. 1 there is shown, in schematic form, a system for sonic bore hole logging, including above ground equipment shown as a block 11 and a down hole tool 13, which is suspended from a wire line 15 which extends from above ground drum-hoist mechanism 17. The down hole tool 13 typically includes a cable head 19, a first electronics section 21, a first transducer 23, a first isolator section 25, a second transducer 27, a second isolator section 29, a third transducer 31, a third isolator section 32, a fourth transducer 34, a second electronics section 33 and a guide nose 35. All components of the system of FIG. 1, except the isolator sections of the down hole tool 13 are conventional and are well known, and consequently need not be shown or described in detail herein. There are many forms of sonic bore hole logging systems and their down hole tool portions, of which the system as well as the general arrangement of the down hole tool of FIG. 1 may be considered typical.

For discussion purposes, the first transducer 23 may be a sonic wave energy transmitter and the second and third transducers 27, 31 may be sonic wave energy receivers, and the fourth transducer 34 may be a sonic wave energy transmitter. As the down hole tool 13 traverses the bore hole 37, sonic wave energy is emitted from the first transducer 23. Some of such emitted energy arrives at the second and third transducers 27, 31 via several routes. A first such route is via the down hole tool structure itself. A second such route is via fluid 39 in the bore hole. A third such route is via the earth formations 41 adjacent the down hole tool. The sonic wave energy that arrives at the receivers 27, 31 via the earth formations 41 provides information from which certain earth formation characteritsics can be determined. Thus it is essential that this third route energy be received with the least possible interference or confusion with first or second route energy. Fortunately the velocity of sonic wave energy in the bore hole fluid (usually drilling mud) is sufficiently slower than in the earth formations that no problems of interference or confusion of second route energy with third route energy occur. Unfortunately, however, the velocity and amplitude of sonic wave energy in the tool structure (first route) are such that serious problems of interference and confusion with third route energy arise. In order to deal with these problems, special tool support structures have been devised to be interposed between adjacent transducers. Such structures are commonly called isolator sections. Ideally, an isolator section will serve to eliminate or reduce to an acceptable level, interference and confusion between first and third route energy. This is accomplished either by delay or attenuation of or a combination of delay and attenuation of the first route energy. Where the predominant characteristic of the isolator section is to lengthen the time interval required for travel of first route energy between transducers, the isolator section is commonly referred to as a delay device. In addition to desirable delay and or attenuation characteristics, the isolator section ideally should exhibit desired structural integrity. This means that while providing a dry internal cavity to accommodate the passage of electrical connections, and while providing rigidity desirable for traversing a well bore, and while exposed to an environment of high external fluid pressures in the neighborhood of fifteen thousand (15,000) pounds per square inch, the isolator section may have the capability of operation for extended time periods without physical failure.

In FIG. 2 of the drawing there is shown an isolator section 25, 29, 32 constructed in accordance with the principles of the present invention. As can be seen, the isolator section 25, 29, 32 is basically an elongated tubular member 43 having the configuration of a collapsed bellows, with an integral internally threaded coupling portion 45 at each end thereof. The coupling portion internal threads mate with external threads 47 of respective transducers 23, 27, 31, 34. A transducer may typically include a mandrel portion 49, a core 51, one or more windings 53, and potting material 55. Each mandrel portion 49 has a bore 57 to permit passage of electrical connections. Suitable gaskets, for example O-rings 59 are provided where necessary to exclude well bore fluids 39 from the interior of the down hole tool 13. The outer surface of the isolator section is preferably coated with rubber 61.

The collapsed bellows configuration is made from an elongated metal tubular member. The metal is preferably mild steel, but other metals such as brass or aluminum alloys might be used. A first series of spaced annular grooves are formed on the exterior wall surface of the member, and a second series of spaced annular grooves are formed on the interior wall surface of the member, with the grooves of the second series being disposed intermediate the respective grooves of the first series. These grooves are preferably formed by turning. Although the transverse section shape of the grooves is preferably rectangular, it is apparent that some other shapes may be employed. For example, the groove bottoms may be rounded and the groove sidewalls may be tapered. After all grooves are formed, sufficient compressive force is exerted on the tubular member to cause the outer marginal portions of each groove to assume substantially abutting relation.

The requisite compressive force may be generated and applied in various ways. For example, the tubular member may be plugged at the ends and placed in a fluid pressure chamber. Or, the tubular member may be placed on a guide mandrel and pressure applied at the member ends by means of mechanical press.

In FIG. 3 there is shown a length of elongated tubular member 43 having an internally threaded coupling portion 45 at one end, and having a first series of spaced annular grooves 63 formed on its exterior wall surface and a second series of spaced annular grooves 65 on the interior wall surface, with the grooves of the second series being disposed intermediate the respective grooves of the first series.

In FIG. 4 there is shown the member of FIG. 3 after sufficient compressive force has been applied on the member to cause the outer marginal portions 67 of each groove to assume substantially abutting relation.

The characteristic velocity of sonic wave energy in steel is such that time interval required to traverse a one foot length is normally about 57 micro-seconds. When the steel is an elongated tubular member having a grooved configuration such as that shown by FIG. 3, the time interval required for sonic wave energy to traverse a one foot length is greatly increased. It is thought that such itme interval may be approximately one hundred sixty (160) micro-seconds. Then, when the elongated tubular member (such as shown in FIG. 3) has assumed the collapsed bellows configuration (such as is shown in FIG. 4), the time interval required for sonic wave energy to traverse a one foot length is again greatly increased. Assuming that the tubular member is foreshortened by one-fourth when collapsed, then it would be expected that the time interval would be increased by one-fourth, to two-hundred micro-seconds. Surprisingly, measurements have indicated that such time interval may be approximately two hundred (280) micro-seconds. Thus, in a typical down hole portion of a sonic wave energy bore hole logging system (refer to FIG. 1) if the distance between the first and second transducers 23, 27 is three feet, then the minimum time interval for travel of sonic wave energy between first and second transducers 23, 27 via the first route (hereinbefore identified as tool structure) will be about six hundred fifty-one (651) micro-seconds. In the actual construction of the isolator section 25 to be used between transducers having a spacing of three feet, the overall isolator length will typically be thirty-four and one-fourth inches, of which twenty-six and one-fourth inches is collapsed bellows configuration and eight inches is end coupling portions and joints between adjacent lengths of collapsed bellows configuration (as will hereinafter be more fully explained). It so happens that the six hundred fifty-one (651) micro-second time interval is slightly greater than the time interval required for travel of sonic wave energy between the first and second transducers 23, 27 via the second route (hereinbefore identified as bore hole fluid). It also happens that the sonic wave energy desired for determination of earth formation characteristics and traveling from the first transducer 23 to the second transducer 27 via the third route (hereinbefore identified as earth formations) will have arrived at the second transducer 27 within less than six hundred (600) micro-seconds.

If the distance between the first and third transducers 23, 31 is five feet, then the minimum time interval required for travel of sonic wave energy from the first transducer 23 to the third transducer 31 via the first route will be about one thousand fifty-one micro-seconds; and the time interval for travel over the second route will be slightly less than one thousand fifty-one micro-seconds. Also, the sonic wave energy desired for determination of earth formation characteristics and traveling from the first transducer 23 to the third transducer 31 via the third route will have arrived at the third transducer within less than one thousand micro-seconds.

In actual practice I have made the collapsed bellows configuration from mild steel tubular stock having outside diameter of two inches and inside diameter of one and one-fourth inches. The grooves were made rectangular, having width of one-eighth inch and depth of one-fourth inch. The spacing between grooves of each series was made three-eighth inch and all grooves were uniformly spaced. I have found it desirable to use ten inch lengths of tubular stock, leaving three inches ungrooved at one end and one-half inch ungrooved at the other end. If the piece is to be used as an end portion of an isolator section, then the three inch portion is a coupling portion 45. Otherwise, two and one-half inches are cut off the three inch portion and the remaining ungrooved portion as well as the one-half ungrooved inch portion at the other end is beveled for welding and used as an intermediate collapsed bellows portion of an isolator section. Thus a typical isolator section 25, 32 having a sonic wave energy traverse time interval of about six hundred fifty-one (651) microseconds may be made up of two end sections and three intermediate sections of collapsed bellows configuration, with adjacent sections being joined by welding. Each end section will have about two inches of coupling portion (the ends are trimmed to give the desired thirty-four and one-fourth inch overall length after welding) and each joint between adjacent collapsed bellows configurations is about one inch, making a total of about eight inches. Each collapsed bellows configuration length is about five and one-fourth inches, giving a total collapsed bellows configuration length of about five and one-fourth inches, giving a total collapsed bellows configuration length of about twenty-six and one-fourth inches. A typical isolator section 29 having a sonic wave energy traverse time of about four hundred micro-seconds may be made up of two end sections and one intermediate section of collapsed bellows configuration, with adjacent sections being joined by welding. The finished overall length of this isolator section will be about twenty-two and three-fourths inches, with about six inches being coupling portion and joint length and about sixteen and three-fourths inches being collapsed bellows configuration. In every case, the sonic wave energy travel time between transducers via the first route, will be additionally slightly increased due to coupling threads and transducer potting material. Isolator sections utilizing the collapsed bellows configuration have proved in actual practice to be very nearly ideal. They accomplish elimination or reduction to an acceptable level of interference between first route (tool structure) and third route (earth formations) energy, while exhibiting desired structural integrity. They provide a dry internal cavity to accommodate the passage of electrical connections; they provide a degree of rigidity that is desirable for traversing a well bore; and they are capable of withstanding at least twenty thousand (20,000) pounds per square inch of external fluid pressure.

For sizes of collapsed bellows configurations having outside diameters larger than two inches, a greater tubular stock wall thickness should be used if the same external pressure capability is desired. Such wall thickness can be calculated using the formula:

$$\text{burst pressure} = \frac{2 \times \text{yield pressure} \left[\frac{d}{t} - 1\right]}{\left[\frac{d}{t}\right]^2}$$

where burst pressure and yield pressure are in pounds per square inch, $d$ is tubular stock outside diameter in inches and $t$ is wall thickness in inches.

When other sizes of tubular stock are used, groove dimensions and spacings may be proportionate to those given above for tubular stock having two inch outside diameter.

I have found that the useful life of an isolator section utilizing the collapsed bellows configuration can be considerably extended and rigidity characteristics improved by tack welding abutting outer marginal portions of each groove at a plurality of points. One form of such tack welding which I have found to be effective is illustrated by FIGS. 5 and 6 of the drawing, wherein the tack welds 69 for the abutting outer marginal portions of each groove are shown to be spaced one hundred twenty (120) degrees and the tack welds 69 of adjacent grooves are shown to be spaced sixty (60) degrees.

Although a sonic bore hole logging system, such as herein shown and described, is an excellent application for the isolator section utilizing the collapsed bellows configuration, it will be apparent that the principles of my invention may be quite useful in other applications. In fact it is contemplated that the present invention may be applied to advantage in any sonic wave energy transmission system to be utilized in an environment of high external fluid pressures and having at least two transducers which are maintained in spaced apart relation by support structure which includes an elongated metal tubular member.

In some applications, attenuation of the sonic wave energy by the isolator section or sections may be the predominant characteristic desired, instead of delay. The collapsed bellows configuration of my invention has attenuation characteristics that would make its use desirable in such applications.

The foregoing disclosure and the showings made in the drawings are merely illustrative of the principles of this invention and are not to be interpreted in a limiting sense.

What is claimed is:

1. In a sonic wave energy transmission system to be utilized in an environment of high external fluid pressures wherein at least two transducers are maintained in spaced relation by support structure which includes an elongated metal tubular member, the improvement in the support structure wherein at least a portion of said tubular member between said transducers has the configuration of a collapsed bellows having its outer marginal portions substantially abutting, whereby desired structural integrity, sonic delay and sonic attenuation are achieved.

2. The apparatus of claim 1 wherein, the substantially abutting outer marginal portions of said collapsed bellows are joined at spaced intervals by tack welds.

3. The apparatus of claim 2 wherein, the tack welds for each substantially abutting outer marginal portion are spaced one hundred twenty degrees (120°) and the tack welds of adjacent substantially abutting outer marginal portions are spaced sixty degrees (60°).

4. A sonic wave energy delaying and attenuating support, comprising: an elongated tubular metal member having the configuration of a collapsed bellows with its outer marginal portions substantially abutting, said member having an outside diameter of at least one inch and a wall thickness of at least one-sixteenth inch.

5. The apparatus of claim 4 wherein, the substantially abutting outer marginal portions of said collapsed bellows are joined at spaced intervals by tack welds.

6. The apparatus of claim 5 wherein, the tack welds for each substantially abutting outer marginal portion are spaced one hundred twenty degrees (120°) and the tack welds of adjacent substantially abutting outer marginal portions are spaced sixty degrees (60°).

7. A sonic wave energy delaying and attenuating support, comprising: an elongated tubular metal member having the configuration of a collapsed bellows with its outer marginal portions substantially abutting, said member having an outside diameter of at least two inches and a wall thickness of at least one-eighth inch.

8. The apparatus of claim 7 wherein, the substantially abutting outer marginal portions of said collapsed bellows are joined at spaced intervals by tack welds.

9. The apparatus of claim 8 wherein, the tack welds for each substantially abutting outer marginal portion are spaced one hundred twenty degrees (120°) and the tack welds of adjacent substantially abutting outer marginal portions are spaced sixty degrees (60°).

References Cited

UNITED STATES PATENTS

| | | | |
|---|---|---|---|
| 2,034,561 | 3/1936 | Davis | 138—173 X |
| 3,191,143 | 6/1965 | Pardue | 340—17 |
| 3,271,733 | 9/1966 | Cubberly | 340—17 |

RODNEY D. BENNETT, Jr., Primary Examiner

DANIEL C. KAUFMAN, Assistant Examiner

U.S. Cl. X.R.

29—454; 72—367; 181—.5; 333—30